United States Patent [19]

Wong

[11] Patent Number: 4,649,810
[45] Date of Patent: Mar. 17, 1987

[54] AUTOMATIC COOKING APPARATUS

[76] Inventor: Don M. Wong, 2296 Bunker Hill Dr., San Mateo, Calif. 94402

[21] Appl. No.: 768,978

[22] Filed: Aug. 22, 1985

[51] Int. Cl.⁴ ............................................. A47J 27/00
[52] U.S. Cl. ........................................ 99/326; 99/331; 99/334; 99/348; 99/352; 222/501; 364/400; 426/523
[58] Field of Search ................. 99/326, 325, 348, 331, 99/334, 352, 407, 409; 364/400; 222/501; 426/523

[56] References Cited

U.S. PATENT DOCUMENTS

| | | | |
|---|---|---|---|
| 1,940,071 | 12/1933 | Brand | 99/440 X |
| 2,633,170 | 3/1953 | Balmain | 222/501 X |
| 2,848,937 | 8/1958 | Martin | |
| 3,326,815 | 6/1967 | Werner | |
| 3,672,294 | 6/1972 | Blixrud | |
| 3,905,585 | 9/1975 | Wallman | |
| 4,196,660 | 4/1980 | Steinberg | 99/353 |
| 4,228,730 | 10/1980 | Schindler | |
| 4,234,605 | 11/1980 | Takeuchi | |
| 4,238,997 | 12/1980 | Hengstenberg | |
| 4,397,561 | 8/1983 | Strong | |
| 4,459,449 | 7/1984 | Hirata | 99/325 X |
| 4,503,502 | 3/1985 | Chapin | 99/348 X |

FOREIGN PATENT DOCUMENTS

2308204  1/1974  Fed. Rep. of Germany ........ 99/325

Primary Examiner—Billy J. Wilhite
Attorney, Agent, or Firm—Townsend and Townsend

[57] ABSTRACT

A microcomputer-controlled, integrated cooking apparatus for automatically preparing culinary dishes. The constituent ingredients of a particular dish are loaded into a compartmentalized carousel, which is mounted on the cooking apparatus. The apparatus includes a memory for storing one or more recipe programs. The recipe program specifies schedules for dispensing the ingredients from the carousel into a cooking vessel, for heating the vessel (either covered or uncovered), and for stirring the contents of the vessel. These operations are performed automatically under control of the microcomputer.

13 Claims, 18 Drawing Figures

AUTOMATIC COOKING APPARATUS

BACKGROUND OF THE INVENTION

The present invention relates to cooking apparatus for the household kitchen.

Many labor-saving and time-saving devices have been devised to assist the home cook. Some such devices are used for preparing the ingredients prior to cooking. These include devices for chopping, grinding and mixing of ingredients and range from the familiar variable-speed electric mixer and blender to the more elaborate food processor with interchangeable blades for preparing such items as chopped onions, sliced potatoes and julienne carrots in a matter of seconds. Other such devices are specially adapted to assist in cooking the prepared ingredients. These include devices dedicated to particular types of food, such as toaster ovens and electric corn poppers, and devices for controlling cooking temperature, such as electric frying pans and woks and electrically heated, insulated crocks for long, slow simmering.

Advances in solid-state electronics and microprocessors have also benefited the experienced home cook and the non-cook alike. For example, kitchen stoves are available with solid state monitoring apparatus for keeping the cook apprised of the temperature in the stove's oven during cooking. Programmable microwave ovens may be used first to defrost and then to cook frozen cuts of meat or frozen pre-prepared dinners.

Although devices of the above sort are of great assistance, the home cook must still interpret and execute a written recipe. The following recipe for a chicken dish known as coq an vin illustrates the cooking steps to be followed without the use of the present invention.

First, roughly three tablespoons of butter are melted in an appropriate pan situated on the top of a stove or in an electric frying pan. To the pan are added one-quarter pound minced salt pork, three-quarters cup chopped onions, one sliced carrot, one peeled clove of garlic, and, if desired, three minced shallots. These ingredients are lightly stirred until browned. The temperature for browning is left to the cook's judgment. The vegetables are then removed, and a disjointed chicken or boned and cut-up chicken breasts are browned in the fat, the temperature and cooking time again being left to the cook's judgment. After the chicken is browned, the temperature is reduced and the following ingredients are added while the contents of the pan are stirred intermittently: two tablespoons flour, two tablespoons minced parsley, and appropriate amounts of chopped fresh chervil, thyme, salt, pepper, the perfunctory bay leaf, and the previously browned vegetables. Finally, one and one-half cups of dry red wine are added. The mixture is simmered, covered, over low heat for roughly one hour. One-half pound of sliced mushrooms is added for the last five minutes of cooking.

For those unpolished in the cooking arts, yet no less appreciative of coq au vin, the above recipe is more difficult to follow than would appear from the printed word. Notwithstanding all the features of known cooking apparatus, inexperienced cooks tend to burn the vegetables and overbrown the chicken. The inexperienced cook, completing the initial steps and leaving the mixture to simmer for one hour, will generally be in need of rest and want to undertake activity unrelated to cooking while waiting to add the mushrooms. The tendency is to rest longer than one hour with sometimes disastrous results if the cooking liquid should boil off.

Even for the experienced cook, to whom the above recipe presents no special difficulty, the preparation calls for constant attention, at least during the initial period, and that is time better put to other uses.

SUMMARY OF THE INVENTION

The present invention provides a computer-controlled integrated cooking apparatus for automatically cooking a culinary preparation according to a predetermined recipe. The cooking apparatus can be programmed to perform all of the necessary steps for heating, stirring, and adding ingredients as called for by the recipe. Apparatus according to invention includes a cooking vessel, and a dispensing structure, generally compartmentalized so as to hold the various ingredients called for by the recipe. The dispensing structure is caused to dispense the various ingredients at the proper times into the cooking vessel upon command from the pre-programmed apparatus. The temperature of an associated heating unit is set and adjusted upon command by the program according to the recipe. The ingredients of the cooking vessel are automatically cooked for prescribed times at prescribed temperatures and stirred where called for by the recipe at rates which are appropriate for the nature of the particular ingredients. When the dish has thoroughly cooked, the heating unit is automatically turned off.

In one embodiment the apparatus includes a support member which has a lower portion for housing the heating unit and an upper portion which supports a dispensing structure in the form of a removable and interchangeable carousel. The upper support portion defines a dispensing aperture through which the ingredients are introduced into the cooking vessel. The various ingredients specified by the recipe, both liquid and solid, are held in a plurality of chambers, defined within the carousel. The chambers are arranged to dispense their contents into the vessel upon command through the dispensing aperture. The apparatus further includes a means for stirring, mixing, or generally agitating the contents of the vessel. For ease of exposition, the term "stirring" is used herein in a broad sense to encompass not only a stirring motion but also other forms of mixing or agitating motions, and no limitation to a particular stirring motion or speed is intended.

Apparatus according to the invention may also be provided with means for automatically covering and uncovering the cooking vessel. In one embodiment the cooking vessel is provided with a tight-fitting lid having an open chute positioned in registration with the dispensing aperture. For uncovered cooking the chute is left open; for covered cooking it is blocked off by a closure member automatically driven by the same mechanism as the stirring means. Although in this embodiment the stirring means and chute-closure member cannot be controlled independently of one another, the embodiment is advantageous in that it eliminates the need for a separate motor or gearing and clutch mechanism for the chute-closure member.

The operation of the apparatus is controlled by a microcomputer system, which stores the predetermined recipe and which includes instructions for selectively causing the various chambers to dispense their contents into the vessel, for monitoring and regulating the heating level, and for activating and deactivating the stirring means so that the ingredients are dispensed into the vessel and are heated and stirred for the precise amounts of time and at the precise levels called for by the recipe.

In alternative embodiments of the invention, the apparatus can be arranged to store a number of recipes and can include display means for alphanumeric displays listing ingredients or giving special instructions for the particular recipe selected from storage. To assist the operator in devising new recipes or adapting favorite recipes to the present apparatus, the apparatus may also have a manual mode in which it is operated by key commands from the user. The apparatus may also be adapted to receive removable recipe cartridges containing a read-only memory with control instructions and comments or "prompts" to be displayed to the operator for preparation of the included recipes.

It is an object of the present invention to provide consistently high-quality, reproducible food preparation. The controlled cooking apparatus disclosed herein achieves that object through precision control over cooking times and temperatures and dispensing and stirring of ingredients—in short, through control of the cooking process itself.

Other aspects, advantages and novel features of the invention are described herein below or will be readily apparent to those skilled in the art from the following specifications and drawings of an illustrative embodiment.

DETAILED DESCRIPTION OF PREFERRED EMBODIMENTS

Figure 1:
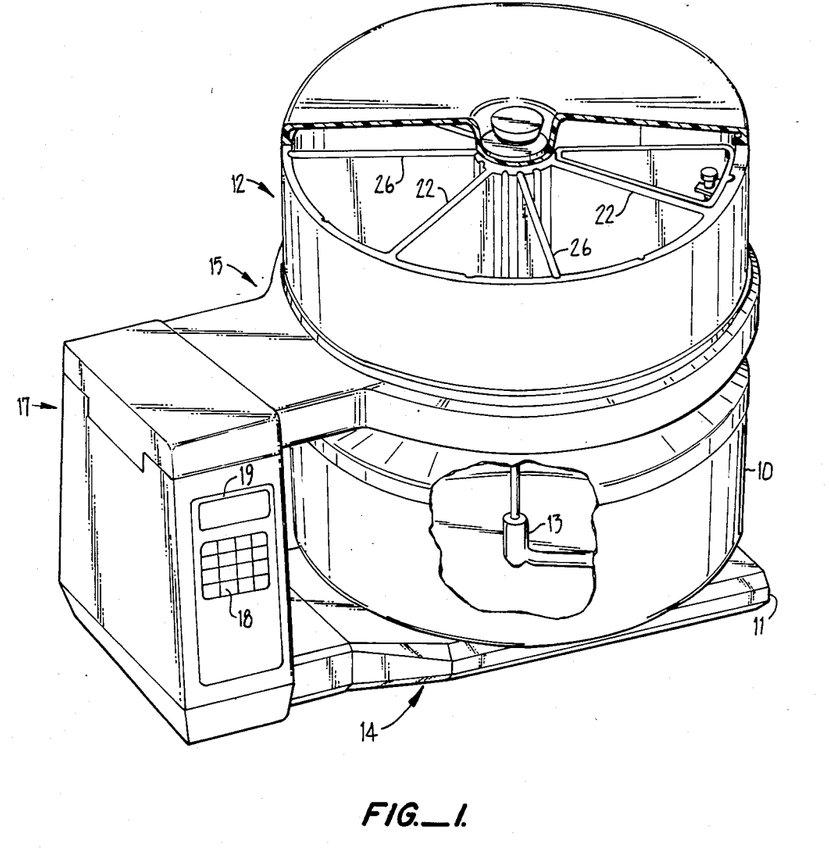
FIG. 1 is perspective view of apparatus according to the invention.

FIG. 1 illustrates a cooking vessel 10 resting on a heating unit 11 and a compartmentalized dispensing structure 12 in the form of a carousel for holding the culinary ingredients called for by a prescribed recipe and for dispensing those ingredients in proper sequence into the cooking vessel 10. Extending into the cooking vessel is a stirring member 13 for stirring the contents. The lower portion 14 of the apparatus housing contains the heating unit 11, and the upper portion 15 which provides support for the dispensing carousel 12. The upper portion 15 also houses portions of the drive mechanisms for the carousel and the stirring member and defines an aperture 16 (see FIG. 2) through which the ingredients held by the carousel 12 are dispensed into the cooking vessel. The central or "tower" portion 17 houses one or more drive motors for the carousel 12 and the stirring member 13 as well as the system electronics, including a memory for storing recipes and control instructions. Mounted on the central portion 17 is a control/display panel including a key pad 18 for entering control or recipe instructions and an alphanumeric display panel 19.

Figure 3:
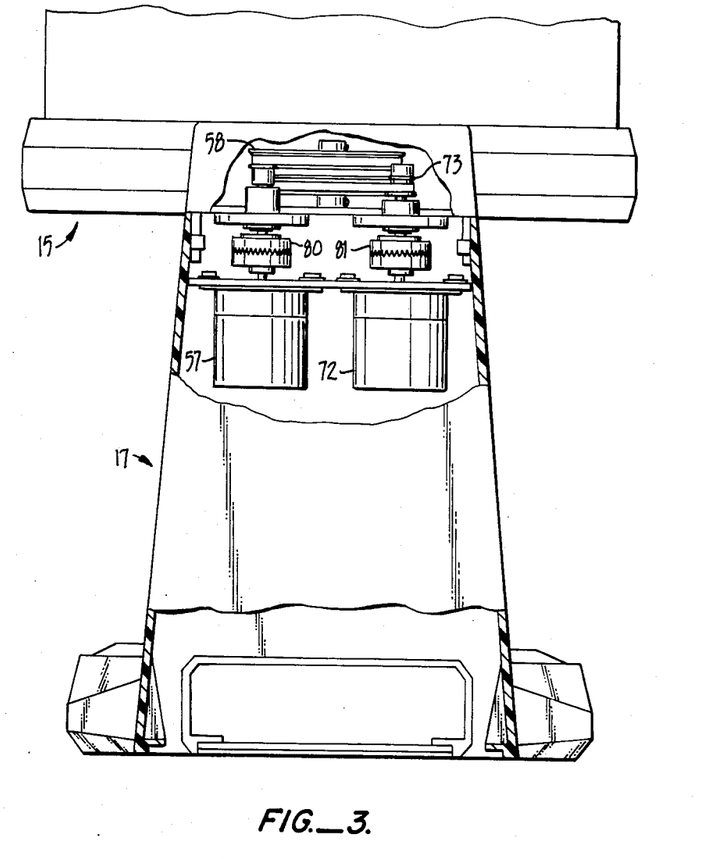
FIG. 3 is a rear elevational view, partially cut away, of the apparatus of FIG. 2.
Figure 4:
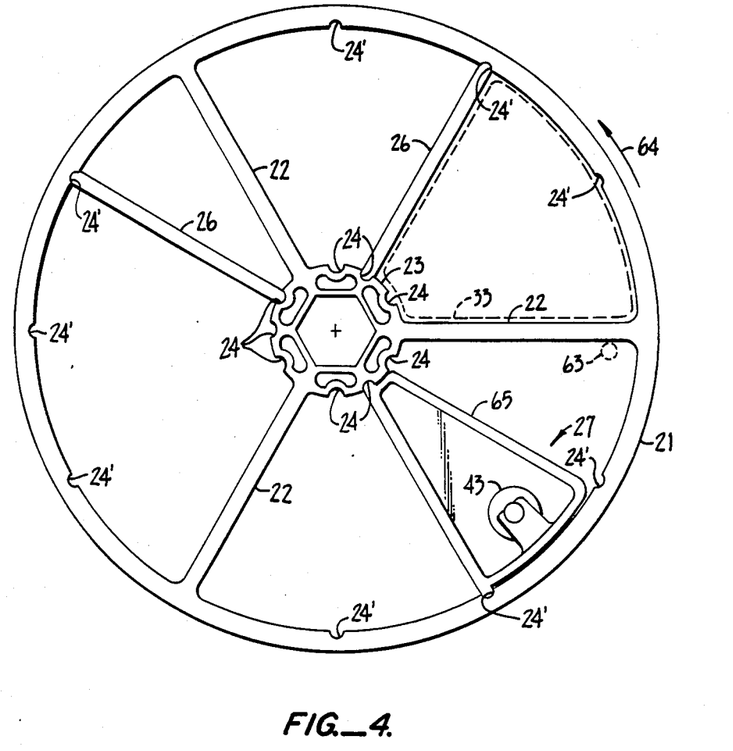
FIG. 4 is a plan view of one embodiment of a dispensing carousel.

The mechanical details of the specific embodiment of FIG. 1 will now be described with further reference to FIGS. 2-4. FIG. 4 illustrates a carousel dispensing unit in which the size and number of the chambers can be varied. The carousel dispensing unit is comprised of an outer cylindrical wall 21 and means, interior to wall 21, defining a plurality of chambers for holding various food ingredients required by the prescribed recipe. In the specific embodiment illustrated in FIG. 4, the carousel includes three fixed interior partitions 22, which also support a centrally disposed hub member 23. The interior portion of the hub member 23 is formed to receive a star cam for driving the carousel and causing it to rotate. The outer face of the hub member 23 and the inner face of the cylindrical wall 21 are formed with pairs of opposed, radially aligned grooves 24 and 24' for receiving either removable partitions 26 or preformed liquid-dispensing units 27. The fixed partitions 22 and removable partitions 26 (and the walls of liquid-dispensing units 27) define a plurality of chambers for holding the solid ingredients called for by the recipe. The number and size of these chambers can be varied by selectively positioning the removable partitions 26. In lieu of a removable partition 26, the outer face of a wall of a receptacle 27 can also serve to define a chamber for solid ingredients.

As described thus far, the carousel assembly is open at its bottom. A separate member 31 provides a solid bottom for the carousel. The bottom member 31 extends radially outward beyond the carousel wall 21 and radially inward beyond the outer face of the central hub member 23. The bottom member 31 includes an aperture bounded on its edges by a continuous lip 33, which extends into the dispensing aperture 16 and engages the walls defining the aperture 16 so as to hold the member 31 in fixed position. The aperture defined by the lip 33 generally follows the shape of a sector and preferably subtends an angle of 60° to provide a sufficiently large opening that bigger food ingredients (such as chunks of stew beef) as might be held in a larger chamber will not become jammed in the opening. The outline of the opening defined by lip 33 is shown in phantom in FIG. 4.

The carousel unit may be enclosed on the top by lid 36 including a handle 37 and snap-on lid retaining assembly 38.

Liquid ingredients are retained in the carousel unit 12 by liquid-dispensing units 27, which may be locked into position as a unit between a pair of opposing grooves 24 and 24'. As best seen in the side cross-sectional view of FIG. 2, a liquid-dispensing unit includes a bottom wall 41 defining an aperture 42 in its outer reaches and sloping slightly downward towards the aperture to facilitate drainage of the liquid into the cooking vessel. The aperture 42 is closed by a resilient stopper 43. The stopper is biased toward its closed position by a compression spring 44 acting through shaft 46. The opening and closing of the stopper 43 is further described below.

The upper arm 15 of the housing provides a support for the carousel unit 12. In the specific embodiment illustrated herein, the upper arm 15 is mounted in cantilever fashion on the tower portion 17 of the apparatus housing. The upper housing portion 15 is mounted to pivot about pin 47. Pin 48 provides a stop to support this housing portion in its cantilevered configuration. The upper support arm 15 includes a side wall 49 which defines the dispensing aperture 16. Aperture 16 is appropriately dimensioned to snugly receive the lip 33 of the bottom member 31 so as to hold the member 31 stationary with respect to the support 15 while the carousel 12 is caused to rotate.

To "uncork" the fluid receptacles 27 at the appropriate time, a camming mechanism is mounted on side wall 49 which extends into aperture 16. The camming mechanism includes an opener cam 50 having a plurality of lobes for contacting the stoppers 43 and a detent cam 51 mounted for rotation with the opener cam 50 and having detents in correspondence with the lobes of the opener cam 50. The detent cam 51 is held in its specified positions by a spring mechanism (not shown). Camming mechanisms of this sort are well known to those skilled in the mechanical arts and thus are not disclosed in further detail herein. Detent cam 51 serves to maintain opener cam 50 in a neutral position, in which a lobe is extending vertically upwards, when no forces are exerted on the opener cam.

Figure 5A:
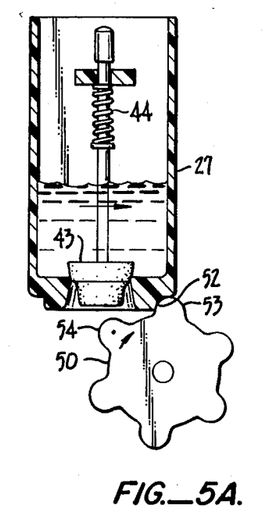
FIGS. 5A-D comprise a cartoon sequence illustrating the dispensing of liquid ingredients.
Figure 5B:
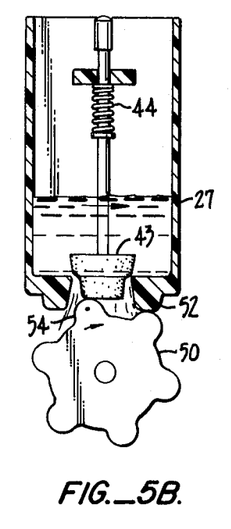
Figure 5C:
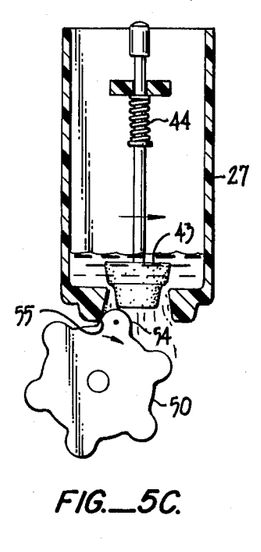
Figure 5D:
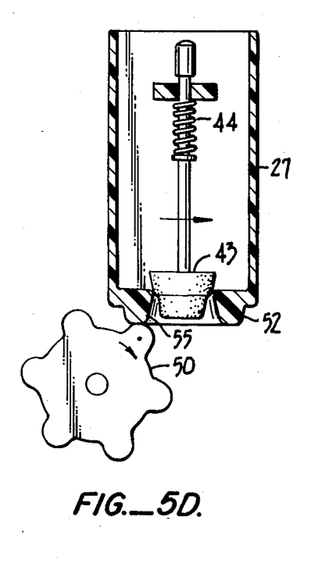

FIGS. 5A-D provide a cartoon sequence illustrating the manner in which liquid ingredients are dispensed into the cooking vessel. In the sequence the fluid receptacle 27 is moving from left to right and opener cam 50 rotates in a clockwise direction about a fixed position. Detent cam 51 (not visible in FIGS. 5A-D) maintains opener cam 50 in a position with a lobe extending vertically upwards when not in the vicinity of a fluid receptacle 27. In FIG. 5A the projection 52 at the leading edge of the drain hole engages the vertically extending lobe 53. In FIG. 5B the opener cam 50 continues to rotate until the next adjacent lobe 54 contacts the bottom of stopper 43, forcing it upward into the interior of the receptacle. When the lobe 54 is vertical, the carousel drive is stopped for a sufficient time or rotates sufficiently slowly to allow the contents of the receptacle to drain into the cooking vessel 10. After a suitable dwell time (if the carousel is stopped), the carousel drive is reactivated if called for by the recipe. In FIG. 5C the projection 55 at the trailing edge of the drain hole engages the lifting lobe 54. In FIG. 5D the lobe 54 is rotated away from stopper 43, which is urged back into its closure position by closure spring 44. The next trailing lobe is meanwhile rotated into vertical position and maintained in that position by detent cam 51 in readiness for the next liquid-dispensing unit 27, if there is one, mounted in the dispensing carousel.

In the illustrated embodiment the chambers holding the liquid and food ingredients are rotated into dispensing position over the dispensing aperture 16. To produce this rotation, the apparatus includes a carousel drive spline 56, which is driven by a carousel drive motor 57 through pulleys 58 and 59 and a carousel drive belt 61. A bearing block 62 mounted in the upper housing portion 15 supports drive spline 56 and pulley 59.

The rotation of the dispensing carousel 12 is controlled by a microswitch 63 (see FIG. 4) mounted on the upper support arm 15 and projecting upward through an opening in the bottom member 31 of the carousel so as to be tripped by a partition as the carousel rotates. The position of the microswitch with respect to the aperture through the bottom member 31 defined by the lip 33 is illustrated in FIG. 4. The microswitch is preferably the low-lying type having a domed cap, which can be depressed by a corner of a passing partition, but which will not be depressed by food ingredients being pushed over the microswitch by an advancing partition. As will be explained more fully below, when the recipe calls for the ingredients of the "next up" chamber to be dispensed, the carousel drive motor will be actuated on command by the control electronics, causing the carousel to rotate in the direction indicated by the arrow 64 in FIG. 4. The trailing wall of the chamber (the wall 65 in FIG. 4) pushes the contents of the chamber over the opening in the bottom member. The rotation will continue until the trailing wall 65 trips the microswitch 63, which provides a signal indicating that the carousel drive motor is to be deactivated. The microswitch is positioned and the control mechanisms are timed so that the trailing wall 65 comes to rest at the edge of the bottom opening.

Those skilled in the art will now recognize alternative mechanisms for signaling the stopping of the carousel rotation. For example, a carousel can be used having fixed partitions angularly spaced at 30° intervals and the rotation can be advanced in predetermined 30° steps. In this alternative, a camming mechanism may be mounted in operative association with the carousel pulley 59 to indicate a "home" position of the carousel. The carousel, in turn, can be keyed to the drive spline 56 so as to be mounted on the drive spline with a well defined home position with respect to the bottom opening. In this alternative the carousel drive motor 57 may be provided by a stepper motor for rotating the carousel through a fixed angle corresponding to a fixed number of steps before automatically coming to a stop.

The contents of the cooking vessel will have to be stirred, mixed, or otherwise agitated from time to time as dictated by the particular recipe. FIG. 2 illustrates a stirring blade 66 mounted on shaft 67, which is inserted into spline 68 mounted in lid 69 of the cooking vessel. The shaft/spline assembly is supported by bearing block 71 mounted in upper support arm 15 and is driven by drive motor 72 through pulleys 73 and 74 and drive belt 75.

For control purposes, described more fully below, the apparatus includes a homing mechanism for determining a "home" position of the stirrer drive assembly. For example, a homing cam and microswitch assembly can be mounted in operative association with the stirrer drive pulley 74 as indicated symbolically at 76 in FIG. 2 to indicate a home position of the spline 68.

The cooking vessel lid 69 is formed with a generally cylindrical wall 77 defining a chute 78 opening into the vessel. The chute is positioned in registration with the dispensing aperture 16. The chute 78 serves both to guide dispensed food ingredients into the cooking vessel and to partially uncover the cooking vessel for those recipes which call for uncovered cooking. Lid 69 is also provided with a chute-closure member 79 having sufficient size to completely close off the chute. The closure member 79 is connected to the chute/blade spline 68 and can be rotated into and out of its position closing off the chute as dictated by the recipe. For simplicity of the mechanical apparatus, both the chute-closure member 79 and the stirring blade 66 are driven by the same drive motor 72. Thus while the ingredients of the cooking vessel are being stirred, the chute will be alternately opened and closed. This mode of operation should not have any significant effect on the dish under preparation because the total amount of time spent stirring the ingredients is normally an insignificant fraction of the cooking time. Moreover, this mode of operation differs little from manual cooking, in which the cover must normally be removed to stir the contents of the vessel. When the ingredients are not being stirred, chute-closure member 79 is left in a fully open or fully closed position, as called for by the recipe.

As indicated above, the upper supporting arm 15 of the housing is cantilevered over the cooking vessel 10 and mounted so as to pivot about the hinge pin 47. To remove the cooking vessel once cooking is completed or to remove the agitating member on the end of shaft 67 for cleaning or replacement with a different member, the dispensing carousel 12 is removed from the support arm 15, which is then merely rotated about the hinge pin 47 to disengage the cooking vessel lid and withdraw the stirring assembly from the pot. Drive motors 57 and 72 are coupled to their respective pulleys 58 and 73 through axial couplers 80 and 81, which serve to decouple the pulleys from the drive motors when the upper support arm 15 is in its raised position.

Figure 2:
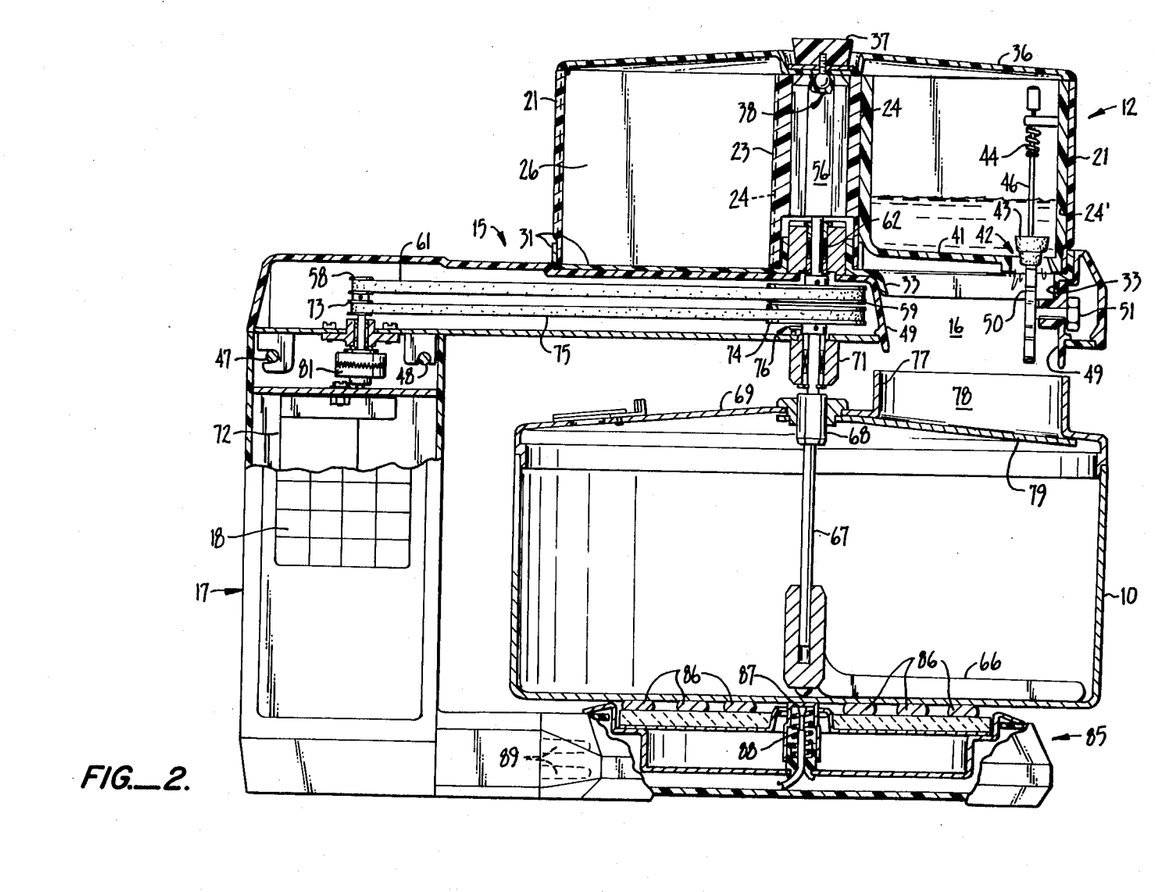
FIG. 2 is a side cross-sectional view of apparatus according to the invention.

As illustrated in FIG. 2, the cooking vessel 10 is heated by an electrical heating unit 85, in which the heat is generated by electrical heating elements 86. The construction of electrical heating units is well known and will not be described in detail herein. The heating unit in FIG. 2 includes a thermal sensing element 87, which is maintained in contact with the bottom of the cooking vessel 10 by a thermal contact spring 88.

The heating unit 85 in FIG. 2 is included within the lower arm 14 of the housing. Alternatively, the heating unit can be provided by a stand-alone electrical heating unit or a gas unit with gas-control valves. In an alternative embodiment, for example, the apparatus can be fabricated with a detachable heating unit including a temperature sensor for maintaining controlled temperature settings. The detachable unit can then be used as a conventional electric heating unit independently of the automatic cooking control apparatus of the present invention.

In this embodiment the lower portion 14 of the housing includes prongs 89 (shown in phantom in FIG. 2) for establishing electrical connection with the heating unit and for connecting the heating unit's temperature sensor with the control apparatus. The heating unit is provided with a mating receptacle for receiving the prongs 89. When it is desired to use the automatic features of the present invention, the detachable unit is merely plugged into position as illustrated in FIG. 2. For stand-alone use the heating unit is provided with a separate electrical power cord with temperature setting controls for connection to a conventional electrical outlet, in the manner of a standard electric frying pan.

Figure 6:
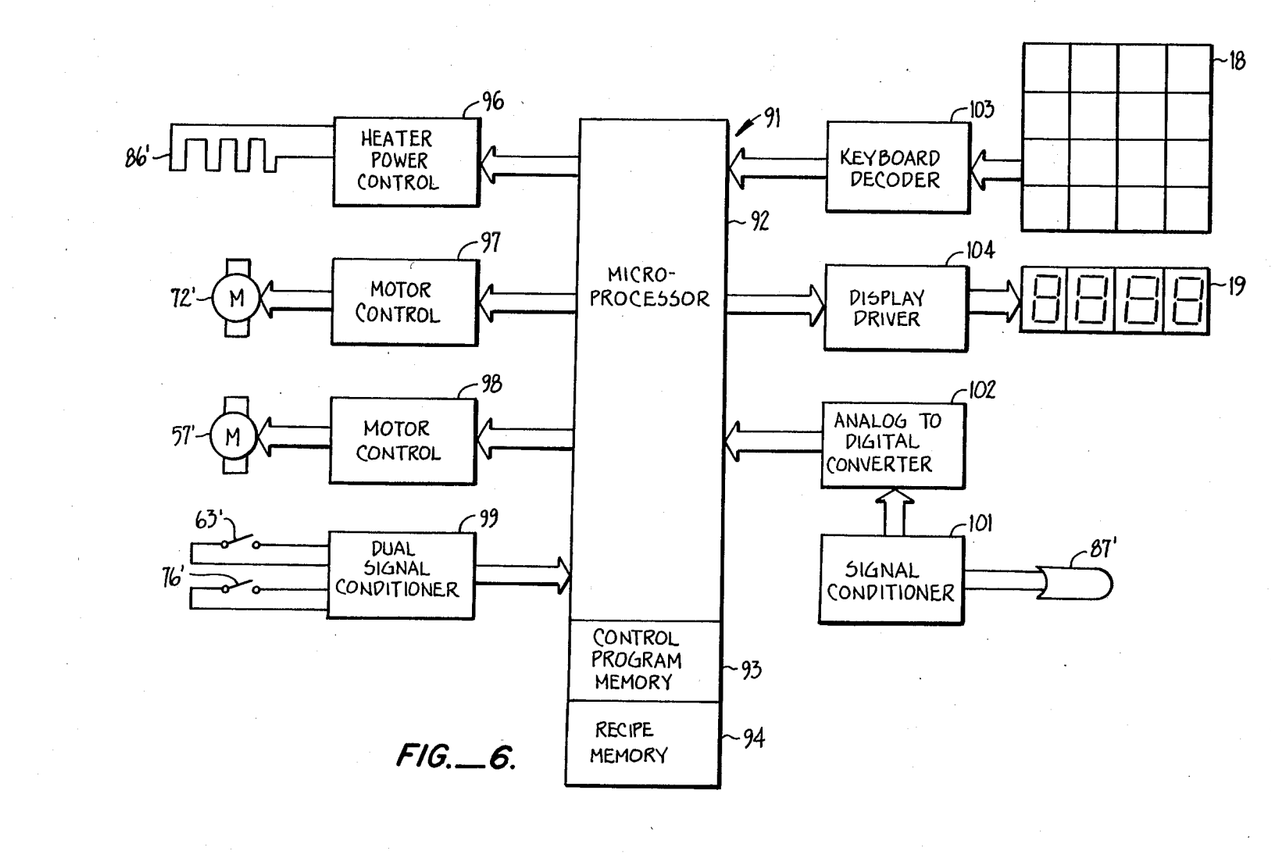
FIG. 6 is a block diagram illustrating the system electronics.

The various automatic operations of the apparatus are controlled by a microcomputer system as illustrated schematically in FIG. 6. Microcomputer system 91 includes microprocessor 92, and associated memories 93 and 94 for storing the microprocessor control programs and recipe programs. The system control programs reside in memory 93 which may comprise a read-only memory, and the user programs reside in memory 94, which may comprise either a random-access memory or, in the case of an insertable recipe cartridge, a read-only memory. The general principles of construction of microcomputer systems are well known and, apart from their specific application to provide the control called for by the present invention, are not described in detail herein.

Heating elements 86 are illustrated schematically in FIG. 5, where they are designated 86'. Similarly in this figure, drive motors 57 and 72 are designated 57' and 72', thermal sensing element 87 is designated 87', and the microswitch assemblies 63 and 76 are designated 63' and 76'.

Microprocessor 92 communicates with heating elements 86' and motors 57' and 72' through heater power control unit 96 and motor control units 97 and 98, respectively. Although not known to be used for the purposes and in the particular combination of the present invention, microprocessors are commonly used to control motors, heating elements and the like in other areas of endeavor and the structure and operation of appropriate heater power control units and motor control units are well known to those skilled in the art, so that these units need not be described in further detail here.

The signals from the microswitch assemblies 63' and 76' for controlling the dispenser motor and stirrer motor are prepared by the signal conditioner 99 (shown for convenience as a dual signal conditioner) before being applied to microprocessor 92. Temperature sensor 87' communicates with the microprocessor 92 through a signal conditioner 101 and analog-to-digital converter 102. A key pad 18 is provided to enter recipe instructions and to allow for manual control of the apparatus as described in more detail below. The key pad 18 communicates with the microprocessor 92 through a conventional keyboard decoder 103. The display 19 is provided, for example, by a conventional seven-segment display for numeric displays or by other conventional means for alphanumeric displays. The display 19 is coupled to microprocessor 92 by an appropriate conventional display driver 104.

Having described the mechanical aspects and general operation of apparatus according to the invention, a more detailed description is now given of illustrative control logic for the microcomputer system 91.

Figure 7:
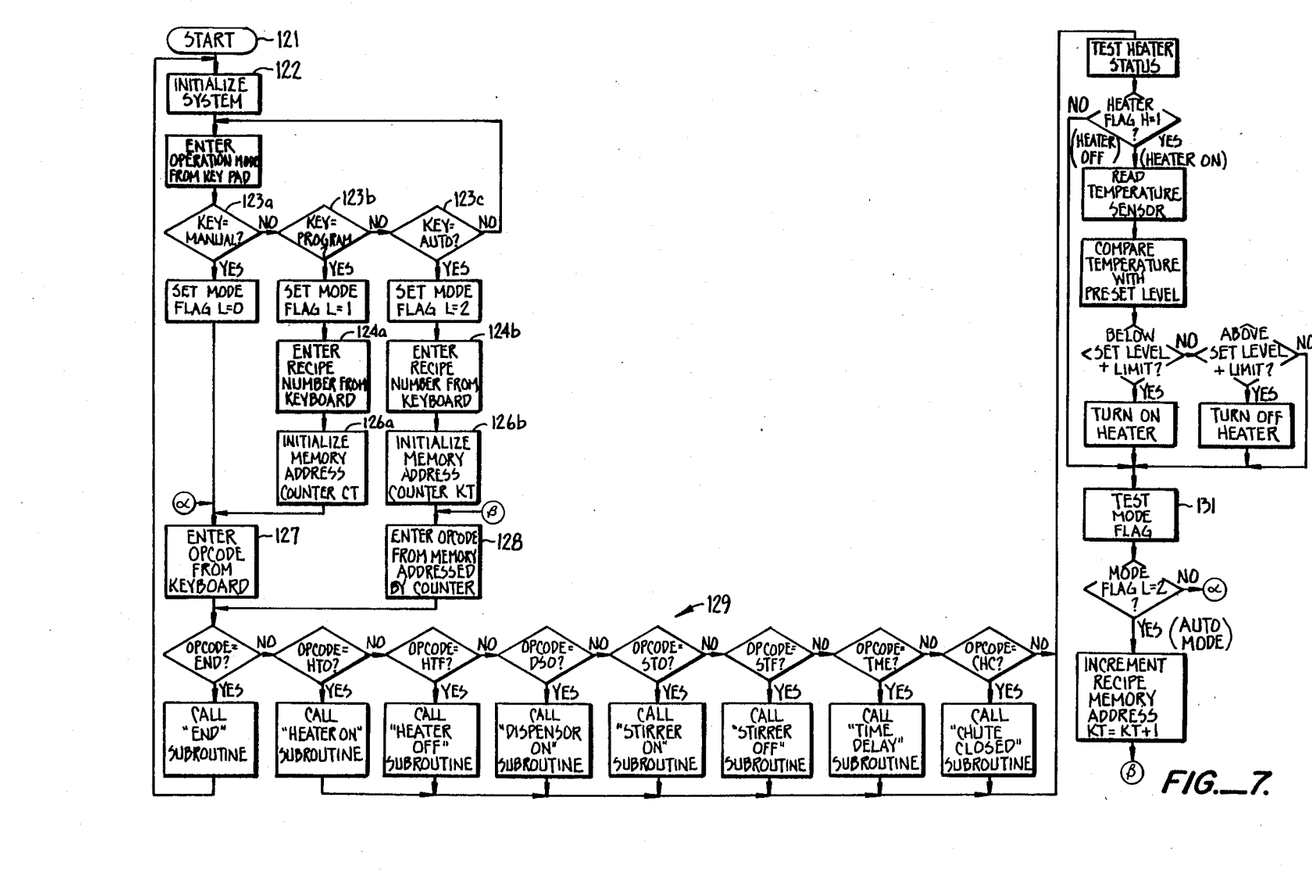
FIGS. 7 and 8A-H are flowcharts illustrating program control logic according to the invention.

FIGS. 7 and 8A–H provide illustrative control logic flow charts. FIG. 7 shows the main program logic, which controls system initialization, controls selection of the system operating mode, calls appropriate subroutines for controlling specific operations of the apparatus, and, when the heating element is energized, regulates the temperature.

The logic provides for three modes of operation: manual, program, and auto. In the manual mode the various functions of the system are controlled from the keyboard. For example, the carousel is commanded to rotate, the stirrer and heating units are turned on and off, the chute is opened and closed, and the cooking time and temperature are set from the key pad. In this mode the user manually steps through the cooking sequence.

In the program mode a sequence of operational steps is entered into memory, but the system is not mechanically activated. The program steps are entered through key pad 18 as in the manual mode and are stored in designated segments of the recipe memory for future use in the auto mode.

In the auto mode the stored program is called up and executed automatically under the control of a software sequencing routine.

FIG. 7 shows the main control program. When the apparatus is powered up (block 121), the system is automatically initialized (block 122) and then awaits a command from the key pad. The user then enters an appropriate command selecting the mode of operation. At blocks 123a, b, and c the key command is sequentially interrogated to determine whether the manual, program, or auto mode has been selected, and a mode flag is then set. In the program and auto modes a recipe name is entered from the keyboard (blocks 124a and b).

In the program mode the recipe name provides a label by which a recipe can be called up, and in the auto mode the recipe name entered designates the recipe to be called from memory.

In a simpler embodiment of the invention the microprocessor responds only to key position entries from the key pad. The recipes are labeled by numbers, which serve as address offsets designating the beginning address of the respective recipe in memory 94. In this embodiment the key pad 18 and display 19 can be of much simpler design. For full alphanumeric recipe labels the microprocessor software includes a software interpreter to decode the alphanumeric key entries. Although the alphanumeric capability is more complicated, it has the advantage that descriptive mnemonics may be used and auxiliary comments and prompts may be stored and displayed. The provision of an appropriate software interpreter as well as a software sequencing routine for execution of the stored programs is well within the routine skill of microprocessor programmers. At blocks 126a and b the respective memory address counters are initialized. At this stage in the manual and program modes, a key command is entered from the key pad designating the next opcode (block 127). In the auto mode an opcode is called from memory at the address indicated by the auto memory address counter KT (block 128).

Whether entered from the keyboard or retrieved from memory, the opcode is then subjected to interrogation chain 129 to determine the subroutine to be called. If the END function is indicated, the system executes the END routine and returns control to the start. Otherwise, after calling and executing the indicated subroutine the system checks the heater status. If the heater flat is set, indicating that the heater is on, the system reads the temperature indicated by temperature sensor 87 (87') and compares the reading with a preset temperature level according to the selected recipe. The temperature is controlled by turning the heating elements on or off; i.e., if the temperature is greater than desired, the heating elements are de-energized, and if less, the heating elements are re-energized. To provide stability to the temperature setting and prevent the microprocessor from continually hunting for the proper temperature setting, the microprocessor will change the status of the heating elements themselves only if the sensed temperature lies outside a specified range about the preset level. The use of such a temperature range is common practice with temperature controllers, and those skilled in the art will readily be able to determine the magnitude of an appropriate range.

After checking the heater status, the system is ready to receive the next opcode. At block 131 the mode flat is checked. If the system is in the manual or program mode, then control is returned to block 127, and the system waits for the next command to be entered from the keyboard. If the system is in the auto mode, then the recipe memory address counter KT is incremented, and control is returned to block 128, where the next opcode is retrieved from memory. The next opcode, whether from the keyboard or from memory, is subjected to interrogation chain 129, and the cycle repeats.

Figure 8A:
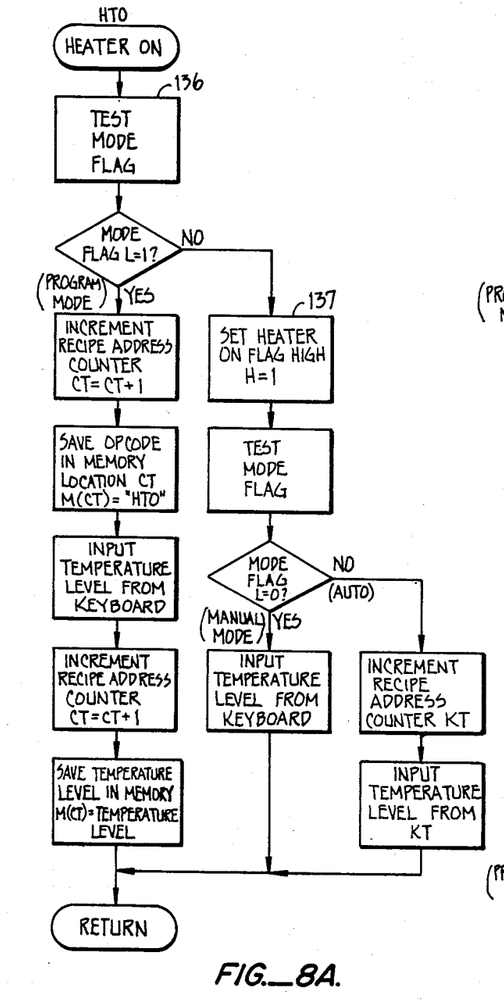

FIG. 8A shows the subroutine for turning on the heater. The HEATER ON routine requires a two-parameter instruction comprising the HTO opcode and a numerical value giving a specific temperature setting or a temperature range such as high, medium or low. Upon entering the subroutine, the mode flag is checked at block 136. If the system is in the manual or auto mode, designated by L=0 or 2 in the flowcharts, a HEATER ON flag is set at block 137. The main program uses the HEATER ON flag to monitor the temperature and send appropriate signals to the heater power control. The second parameter, i.e., the temperature level, is then entered, either from the keyboard in the manual mode or from the proper address in the recipe memory in the auto mode, and control is returned to the heater monitoring chain in FIG. 7.

In the program mode, the HTO opcode along with the heater level setting are stored in the recipe memory and control is returned to the main program.

Figure 8B:
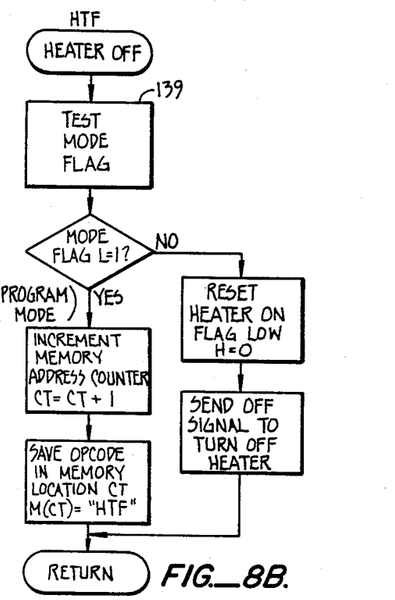

FIG. 8B shows the heater off subroutine called by opcode HTF. As in the heater on subroutine, the mode of operation is tested at block 139. In the manual and auto modes the heater flag is reset to its low state indicating the heater is off and a signal is sent to control unit 96 to deenergize the heating elements. In the program mode the HTF opcode is merely stored in memory.

Figure 8C:
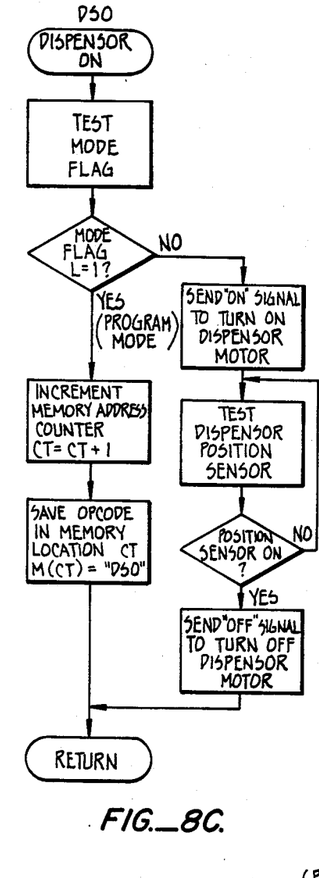

FIG. 8C shows the subroutine, designated in DSO, for activating the dispensing means. In the manual and auto modes a signal is sent to dispenser motor control unit 98 to energize the dispenser drive motor 57. If a sensor is used, such as the microswitch 63, to sense whether the dispenser has rotated to the next dispensing position, then the subroutine contains a test loop for continually testing the position sensor until the dispensing position is reached. At that point a signal is sent to motor control 98 to deenergize the drive motor. Alternatively, dispensing unit 12 can be provided with a specified home position and the microprocessor can keep track of the angle through which dispensing means 12 has rotated as described above. This can be accomplished, for example, by employing a stepper motor for drive motor 57 and monitoring the number of steps the motor undertakes. Those skilled in the art will appreciate that other forms of dispensing means could be employed, for example, means defining chambers which can be opened and closed by solenoid-actuated mechanisms. The writing of DSO subroutines appropriate for controlling such other mechanisms is well within the skill of those in the microprocessor programming art, and therefore such other embodiments of the invention are not specifically disclosed herein in detail.

Figure 8D:
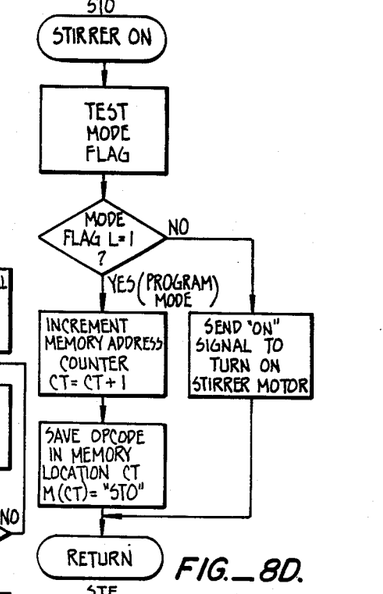
Figure 8E:
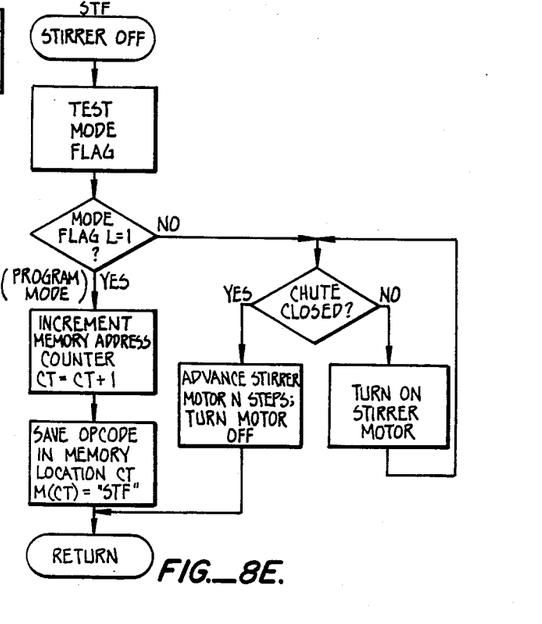

FIGS. 8D and E show the subroutines STO and STF for turning on and off the stirring mechanism. In both of these subroutines, in the program mode the opcode is merely stored in memory. In the manual or auto modes an appropriate signal is sent to motor control unit 97 to energize or deenergize the drive motor. These illustrative subroutines provide for only one motor speed. These routines may readily be modified to include several motor speeds and to allow for bidirectional stirring.

Since the chute-closure member 79 is also driven by the same motor as the stirrer member, the STIRRER OFF subroutine contains additional program steps to assure that the stirrer member comes to rest with the chute 78 left open. A separate routine is provided specifically to close the chute 78. Microprocessor 92 receives a closure signal from the homing mechanism at 76 in FIG. 2 indicating when the chute 78 is closed. The home position corresponds to the closed position of chute-closure member 79. In response to the closure signal from the homing mechanism, the microprocessor commands the stirrer drive motor 72, which in this embodiment is preferably provided by a stepper or AC motor, to undergo a predetermined number of steps N and then deactivates the motor. The number N is chosen with the inertial effects of the moving stirring mechanism taken into account so that the stirring mechanism will come to rest with the chute-closure member in an open position.

Figure 8F:
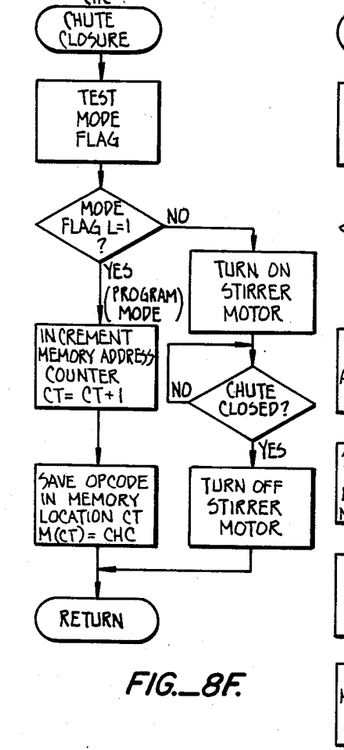

FIG. 8F shows a subroutine for closing the chute 78. Consistent with the STIRRER OFF subroutine, the chute 78 will always be open when the CHUTE CLOSURE subroutine is called. In the manual and auto modes, the routine begins by activating the stirrer motor. When the home position is sensed, the motor is deactivated. The home position sensor may be offset in its location if necessary to account for any significant continued inertial motion of the chute-closure member before that member comes to rest in its closed position.

Figure 8G:
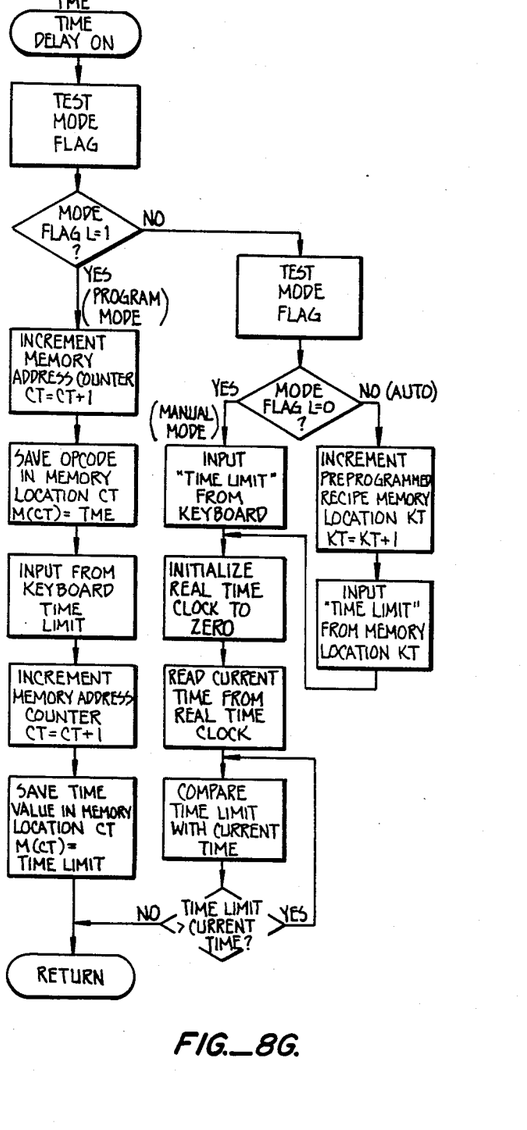

FIG. 8G shows a subroutine, designated in TME, for specifying the cooking time. This subroutine calls for a two-parameter instruction. The first is the opcode TME, and the second is the cooking time. In the manual mode the cooking time, measured in hours, minutes or seconds, is entered from the keyboard. The microprocessor initializes a real-time clock and, through a counting loop in the subroutine, counts down for the designated time. When the timing loop is completed, control returns to the main program. The auto mode operates similarly, except that the appropriate time limit is recalled from the memory location indicated by the recipe address counter KT. In the program mode the program address counter CT is incremented, the TME opcode is stored in memory, the address counter is incremented again, and the time limit is stored in memory.

Figure 8H:
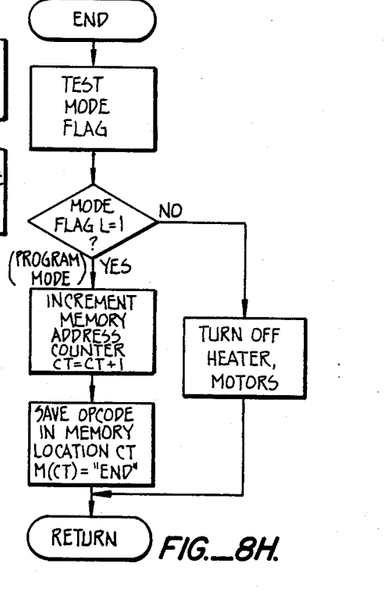

FIG. 8H shows an END subroutine, which turns off the heating unit and stirrer and dispenser motors at the end of the sequence of recipe instructions.

It will be appreciated that the logic flow charts illustrated in FIGS. 7 and 8A–G provide only an illustrative control logic scheme according to the invention. Other logic schemes could be used to accomplish the same functions. Indeed, other mechanical arrangements equivalent to the ones illustrated herein may even require different logic schemes.

By way of illustration, the following "recipe" is provided for coq au vin according to the present invention. First, a carousel with its bottom member attached is loaded with the constituent ingredients as follows. In the first compartment to be dispensed is: three tablespoons butter; in the next compartment: minced salt pork, chopped onions, sliced carrot, garlic and shallots in the proportions indicated above; in the next compartment: boned and cubed chicken breasts; in the next compartment: the leafy herbs, namely, the parsley, chervil, and thyme; in the next compartment: one and one-half cup red wine which has been mixed with two tablespoons flour and with the salt and pepper. This is most easily accomplished by vigorously shaking the wine in a closed jar with the flour, salt and pepper. This compartment will, of course, be providing by a liquid-dispensing unit 27. In the final compartment are placed the mushrooms. The carousel is placed on the drive spline aligned so that the butter will be the first item dispensed. The further steps are then controlled by the following recipe program listing, in which cooking times are given in minutes and seconds (e.g., 01 30 indicates 1 minute 30 seconds) and heating levels are specified on a scale of 1 to 10, with 10 being the hottest.

| COQ AU VIN | |
|---|---|
| Instructions | Comments |
| HTO 10 | Heat up pot |
| TME 01 00 | for 1 minute |
| DSO | Dispense butter |
| TME 00 30 | Melt butter |
| DSO | Dispense vegetables, pork |
| TME 00 05 | |
| STO | Stir vegetables |
| TME 00 05 | |
| STF | |
| TME 00 30 | Cook 30 seconds |
| STO | Stir vegetables |
| TME 00 05 | |
| STF | |
| TME 00 30 | Cook 30 seconds |
| END | Remove vegetables from pot; Add to carousel compartment with leafy herbs. Continue program. |
| HTO 10 | Heat pot for 30 seconds |
| TME 00 30 | |
| DSO | Dispense chicken |
| TME 01 00 | Cook 1 minute |
| STO | Stir chicken |
| TME 00 05 | |
| STF | |
| TME 01 00 | Cook 1 minute |
| STO | |
| TME 00 05 | |
| STF | |
| TME 01 00 | Cook 1 minute |
| HTO 4 | Lower heat |
| TME 00 02 | |
| DSO | Dispense herbs, vegetables |
| TME 00 02 | |
| STO | Stir |
| TME 00 05 | |
| STF | |
| DSO | Dispense wine |
| TME 00 02 | |
| CHC | Close Chute |
| TME 15 00 | Cook 15 minutes |
| STO | Stir |
| TME 00 10 | |
| STF | |
| CHC | |
| TME 15 00 | Cook 15 minutes |
| STO | Stir |
| TME 00 10 | |
| STF | |
| CHC | |
| TME 15 00 | Cook 15 minutes |
| STO | Stir |
| TME 00 10 | |
| STF | |
| CHC | |
| TME 10 00 | Cook 10 minutes |
| STO 00 05 | Stir, leave uncovered |
| STF | |
| TME 00 02 | |
| DSO | Dispense mushrooms |
| TME 00 02 | |
| STO | Stir |
| TME 00 05 | |
| STF | |
| CHC | Close chute |
| TME 05 00 | Cook 5 minutes |
| END | |

The above program listing is offered as an illustration of the operation of the present invention and is not offered for its epicurean results. Indeed, it has not yet been optimized to produce an acceptable coq au vin, which requires fine adjustments in the cooking times and heating levels.

While the above provides a full and complete disclosure of the preferred embodiments of the invention, various modifications and equivalents will occur to those skilled in the art given the benefit of this disclosure. It is to be expressly understood that the invention is not intended to be limited only to the specific examples and embodiments disclosed herein, but is defined by the appended claims.

What is claimed is:

1. Apparatus for automatically cooking a culinary preparation of prescribed ingredients according to a predetermined recipe comprising:
   a cooking vessel;
   dispensing means structured and arranged to hold and to dispense said ingredients into said vessel;
   heating means for heating said vessel;
   stirring means for stirring the contents of said vessel;
   control means communicating with said dispensing means for controlling the dispensing of said ingredients therefrom according to a dispensing schedule predetermined by said recipe, said control means further communicating with said heating means for controlling the heating of said vessel according to a heating schedule predetermined by said recipe, and said control means further communicating with said stirring means for controlling the stirring of said contents according to a stirring schedule predetermined by said recipe;
   means, responsive to said control means, for automatically closing said cooking vessel; and
   memory means for storing control instruction according to said recipe.

2. In an apparatus for automatically cooking a culinary preparation of prescribed ingredients according to a predetermined recipe, including a cooking vessel, heating means for heating the vessel, dispensing means for holding and dispensing said ingredients into said vessel, and control means communicating with said dispensing means and with said heating means for controlling the dispensing of said ingredients and the heating of said vessel according to dispensing and heating schedules predetermined by said recipe, the improvement wherein
   said dispensing means comprises:
      a chamber-defining assembly mounted for rotation and formed with a plurality of chambers of first and second types, said first type for holding non-liquid ingredients and said second type for holding liquid ingredients; and
      means, actuated by rotation of said chamber-defining assembly, for mechanically causing the contents of said chambers to be dispensed, in sequence, into said vessel; and
   said apparatus further comprises means for rotating said chamber-defining assembly upon command from said control means.

3. The apparatus of claim 2 wherein said chamber-defining assembly includes demountable first and second means for defining a selectable number of said first and second types of chambers, respectively.

4. The apparatus of claim 3 wherein
   said dispensing means defines a dispensing aperture over said vessel and each said chamber has an opening at the bottom thereof; and
   said means for rotating said chamber-defining assembly is operable upon command from said control means to bring the openings of said chambers sequentially into registration with said aperture at times specified by said dispensing schedule.

5. The apparatus of claim 4 wherein
   said second type of chamber includes a stopper and means for biasing said stopper in a position closing the opening at the bottom of said chamber; and
   said dispensing means further comprises cam means responsive to rotational movement of said chamber-defining assembly for urging said stopper out of said opening when the respective chamber opening is in registration with said dispensing aperture.

6. In an apparatus for automatically cooking a culinary preparation of prescribed ingredients according to a predetermined recipe, including a cooking vessel, heating means for heating the vessel, dispensing means for holding and dispensing said ingredients into said vessel, agitation means for agitating the contents of said vessel, and control means communicating with said dispensing means, heating means, and agitation means for controlling the dispensing and agitation of said ingredients and the heating of said vessel according to dispensing, agitation, and heating schedules predetermined by said recipe, the improvement wherein
   said cooking vessel is disposed in fixed relation with respect to said heating means; and
   said agitation means comprises a stirring member extending into said vessel and mounted for rotation about a vertical axis for stirring the contents of said vessel in a generally circular pattern; and
   said apparatus further comprises means for rotating said stirring member upon command from said control means.

7. The apparatus of claim 6 wherein said means for rotating said stirring member is operable for bidirectional rotation of said stirring member.

8. The apparatus of claim 7, further comprising:
   a lid for covering said cooking vessel, said lid being formed with a lid aperture through which said dispensing means dispenses ingredients into said vessel; and
   a closure member sized to cover said lid aperture, said closure member being mounted for rotation about said vertical axis, and being rotated by said means for rotating said stirring member into position closing said lid aperture upon command from said control means.

9. The apparatus of claim 6 wherein said dispensing means comprises:
   a chamber-defining assembly mounted for rotation and formed with a plurality of chambers therein of first and second types, said first type for holding non-liquid ingredients and said second type for holding liquid ingredients; and
   means, actuated by rotation of said chamber-defining assembly for mechanically causing the contents of said chambers to be dispensed, in sequence, into said vessel; and
   said apparatus further comprises means for rotating said chamber-defining assembly upon command from said control means.

10. The apparatus of claim 9 wherein said chamber-defining assembly includes demountable first and second means for defining a selectable number of said first and second types of chambers, respectively.

11. Apparatus suitable for use in a domestic kitchen for automatically cooking a culinary preparation of prescribed ingredients according to a predetermined recipe comprising:
   a cooking vessel having substantially vertical walls;
   heating means for heating said vessel;

dispensing means for holding and dispensing said ingredients into said vessel, said dispensing means comprising:
- a chamber-defining assembly mounted for rotation and formed with a plurality of chambers therein of first and second types, said first type for holding non-liquid ingredients and said second type for holding liquid ingredients; and
- means, actuated by rotation of said chamber-defining assembly, for mechanically causing the contents of said chambers to be dispensed, in sequence, into said vessel;

a housing having a lower portion for housing said heating means, whereby said vessel is maintained in heat transfer relation to said heating means, and an upper portion for supporting said chamber-defining assembly over said vessel;

a stirring member extending into said vessel and mounted for rotation about a vertical axis for stirring the contents of said vessel in a generally circular pattern;

a lid for covering said vessel, said lid being formed with a lid aperture through which said dispensing means dispenses ingredients into said vessel, and a closure member mounted for rotation about said vertical axis and sized to cover said lid aperture;

control means for controlling the heating of said vessel, the dispensing and stirring of said ingredients, and the covering and uncovering of said lid aperture according to heating, dispensing, stirring, and covering schedules predetermined by said recipe;

means for rotating said chamber-defining assembly upon command from said control means;

means for simultaneously rotating said stirring member and said closure member upon command from said control means according to said stirring and dispensing schedules; and memory means for storing control instructions according to said recipe;

wherein said control means and said means for rotating are housed within said housing so as to form a compact, self-contained, integrated cooking apparatus.

12. The apparatus of claim 11 wherein said control means comprises a microprocessor and said apparatus further comprises manual key entry means communicating with said microprocessor for manually activating and deactivating said dispensing, heating, and stirring means and for manually setting a heating level and a heating time for said heating means, said microprocessor and said key entry means being housed within said housing.

13. The apparatus of claim 12 wherein said memory means comprises a memory cartridge removable from said housing.

* * * * *